(12) United States Patent
Bosnyak et al.

(10) Patent No.: US 9,806,343 B2
(45) Date of Patent: *Oct. 31, 2017

(54) LEAD-ACID BATTERY FORMULATIONS CONTAINING DISCRETE CARBON NANOTUBES

(71) Applicant: MOLECULAR REBAR DESIGN, LLC, Austin, TX (US)

(72) Inventors: Clive P. Bosnyak, Dripping Springs, TX (US); Kurt W. Swogger, Austin, TX (US)

(73) Assignee: Molecular Rebar Design, LLC, Austin, TX (US)

( * ) Notice: Subject to any disclaimer, the term of this patent is extended or adjusted under 35 U.S.C. 154(b) by 199 days.

This patent is subject to a terminal disclaimer.

(21) Appl. No.: 14/670,178

(22) Filed: Mar. 26, 2015

(65) Prior Publication Data
US 2015/0200400 A1    Jul. 16, 2015

Related U.S. Application Data (62) Division of application No. 13/529,792, filed on Jun. 21, 2012, now Pat. No. 8,993,161.

(60) Provisional application No. 61/638,454, filed on Apr. 25, 2012, provisional application No. 61/500,561, filed on Jun. 23, 2011.

(51) Int. Cl.
| | | |
|---|---|---|
| *H01M 4/62* | (2006.01) | |
| *H01M 4/14* | (2006.01) | |
| *H01M 4/20* | (2006.01) | |
| *H01M 4/66* | (2006.01) | |
| *B82Y 30/00* | (2011.01) | |
| *H01M 4/36* | (2006.01) | |
| *H01M 4/68* | (2006.01) | |
| *C08K 3/04* | (2006.01) | |
| *C08K 7/06* | (2006.01) | |

(52) U.S. Cl.
CPC .............. *H01M 4/627* (2013.01); *B82Y 30/00* (2013.01); *C08K 3/04* (2013.01); *H01M 4/14* (2013.01); *H01M 4/20* (2013.01); *H01M 4/364* (2013.01); *H01M 4/624* (2013.01); *H01M 4/625* (2013.01); *H01M 4/663* (2013.01); *H01M 4/667* (2013.01); *H01M 4/68* (2013.01); *C08K 7/06* (2013.01); *H01M 2220/10* (2013.01); *H01M 2220/20* (2013.01); *Y02E 60/126* (2013.01)

(58) Field of Classification Search
CPC ......... H01M 4/364; H01M 4/68; H01M 4/20; H01M 4/667; H01M 4/663; H01M 4/627; H01M 4/625; H01M 4/624; H01M 4/14; H01M 2220/10; H01M 2220/20; Y02E 60/126
USPC .................................................. 429/215, 232
See application file for complete search history.

(56) References Cited

U.S. PATENT DOCUMENTS

| | | | |
|---|---|---|---|
| 6,268,081 B1 * | 7/2001 | Clough ................... | H01M 2/16 429/212 |
| 7,070,753 B2 * | 7/2006 | Niu ........................ | B82Y 30/00 423/447.1 |

(Continued)

FOREIGN PATENT DOCUMENTS

| | | | | |
|---|---|---|---|---|
| KR | 10-2006-0075473 | * | 7/2006 | ............... H01M 4/14 4/2 |

*Primary Examiner* — Osei Amponsah
(74) *Attorney, Agent, or Firm* — Stephen P. Krupp (57) ABSTRACT

Compositions of discrete carbon nanotubes for improved performance lead acid batteries. Further disclosed is a method to form a lead-acid battery with discrete carbon nanotubes.

22 Claims, 4 Drawing Sheets

(56) References Cited

U.S. PATENT DOCUMENTS

| | | | |
|---|---|---|---|
| 2003/0143453 A1* | 7/2003 | Ren | B82Y 10/00 |
| | | | 429/209 |
| 2004/0160156 A1* | 8/2004 | Ohata | B82Y 30/00 |
| | | | 313/346 R |
| 2011/0104551 A1* | 5/2011 | Yang | H01M 4/133 |
| | | | 429/149 |

* cited by examiner

LEAD-ACID BATTERY FORMULATIONS CONTAINING DISCRETE CARBON NANOTUBES

This application claims priority to U.S. Provisional Patent Application Ser. No. 61/500,561, entitled "LEAD-ACID BATTERY FORMULATIONS COMPRISING DISCRETE CARBON NANOTUBE FIBERS," filed on Jun. 23, 2011, to U.S. Provisional Patent Application Ser. No. 61/638,454, entitled "LEAD-ACID BATTERY FORMULATIONS COMPRISING DISCRETE CARBON NANOTUBE FIBERS," filed on Apr. 25, 2012, to U.S. patent application Ser. No. 13/529,792, entitled "LEAD-ACID BATTERY FORMULATIONS CONTAINING DISCRETE CARBON NANOTUBES," filed on Jun. 21, 2012 and which will issue as U.S. Pat. No. 8,993,161 on Mar. 31, 2015, the entire content of each of which is hereby incorporated by reference.

FIELD OF THE INVENTION

The present invention is directed to novel compositions and methods for producing a lead-acid battery with discrete carbon nanotubes or mixtures of discrete carbon nanotubes and plates of graphene or oxidized graphene.

BACKGROUND

Carbon nanotubes can be classified by the number of walls in the tube, single-wall, double wall and multiwall. Each wall of a carbon nanotube can be further classified into chiral or non-chiral forms. Carbon nanotubes are currently manufactured as agglomerated nanotube balls or bundles. Use of carbon nanotubes and graphene as enhanced performance additives in batteries is predicted to have significant utility for electric vehicles, and electrical storage in general. However, utilization of carbon nanotubes in these applications is hampered due to the general inability to reliably produce individualized carbon nanotubes.

The performance goals of a lead-acid battery are to maximize the specific power (power per unit of weight, measured in watts per kilogram) over designated high rate discharge scenarios, and maximize battery life, not only in environmental durability but also most importantly in cycle life (number of possible charges, and discharges).

Both corrosion (on the positive plate) and sulfation (on the negative plate) define two key failure modes of today's lead acid batteries. Regarding corrosion failures, this failure mode begins to accelerate either as temperatures rise about 70° F., and/or if the battery is left discharged. To mitigate the effects of the corrosion process, most battery companies focus their research on developing more corrosion resistant lead-alloys and grid manufacturing processes that reduce the mechanical stresses in the as-manufactured grids. Regardless of the alloy or grid fabrication process, essentially all battery manufacturers engineer battery service life based on lead alloy and grid wire cross-sectional area. Normally this engineering translates as a change in grid thickness and corresponding plate thickness. Thicker grids provide longer life, but usually sacrifice power density, cost, weight, and volume.

Regarding sulfation failures, when a lead acid battery is left on open circuit stand, or kept in a partially, or fully discharged state for a period of time, the lead sulfate formed in the discharge reaction recrystallizes to form larger, low surface area lead sulfate crystals which are often referred to as hard lead sulfate. This low surface area, non-conductive lead sulfate, blocks the conductive path needed for recharging. These crystals, especially those furthest removed from the electrode grid, are difficult to convert back into the charged lead and lead dioxide active materials. Even a well maintained battery will lose some capacity over time due to the continued growth of large lead sulfate crystals that are not entirely recharged during each recharge. These sulfate crystals, of density 6.287 g/cc, are also larger in volume by about 37% than the original paste, so they mechanically deform the plate and push material apart. The resulting expansion and deformation of the plates also causes active material to separate from the electrodes with a commensurate loss of performance. Sulfation is the main problem in recreational applications during battery storage when the season ends. Boats, motorcycles, snowmobiles lie dormant in their off-use months and, left uncharged, discharge toward a zero % state-of-charge, leading to progressive sulfation of the battery. Thus, the battery cannot be recharged anymore, is irreversibly damaged, and must be replaced.

As users have come to know portable battery products in cell phones and laptop computers, they have correspondingly become comfortable with the process of bringing a battery down to almost no charge and then bringing it back to full, complete charge and power capabilities within hours. Traditional lead-acid batteries, because of their inherent design and active material utilization limitations, only provide relatively good cycle-life when less than about 80% of the rated capacity is removed during each discharge event in an application. A battery of this type suffers a significant decrease in the number of times it can be discharged and recharged, i.e., cycle life, when 100% of the rated capacity is consumed during a single discharge in an application. Many new products that historically used lead-acid batteries are requiring a significant jump in cycle life. The most notable examples are Hybrid Electric Vehicles, which operate in a High Rate Partial-State-of-Charge condition. This is a punishing application which dramatically shortens the cycle life of a typical lead acid battery, and has therefore left car companies with no choice, but to go to much more expensive Nickel-Metal Hydride batteries, and experiment with Lithium ion batteries.

Typically, a lead-acid battery will require a recharge time significantly longer than competitive batteries containing advanced materials seen in portable products. A complete charging of a lead-acid battery, such as found in electric vehicles, can take from 8 to 16 hours. In the case of Uninterrupted Power Supplies (UPS), a rapid charge rate is essential to ensuring quality performance, as well as reducing the related capital expenditures for back up equipment while charging takes place on initial batteries put into service.

Environmental conditions such as vibration can also result in degradation of a lead-acid battery due to active material separating from the cathode or anode. More vibration-resistant batteries, such as used for pleasure boats, often contain thicker electrodes or special vibration damping structures within the battery. This increases the weight and cost of the battery. Hence, an increased mechanical strength of the active material paste would be a highly desirable feature.

Traditional methods for producing battery plates for lead-acid batteries generally involve a mixing, curing and drying operation in which the active materials in the battery paste undergo chemical and physical changes that are used to establish the chemical and physical structure and subsequent mechanical strength necessary to form the battery plate. To produce typical battery plates, materials are added to commercial paste mixing machines common in the industry in the order of lead oxide, flock, water and sulfuric acid, which are then mixed to a paste consistency. The flock component is a fibrous material, usually composed of polyester, nylon or acrylic fibers, which is added optionally to the paste to increase the mechanical strength of the pasted plate. An "expander" component is conventionally added to the negative paste consisting of a mixture of barium sulfate, carbon black and lignosulfonate that is added to the negative paste to improve the performance and cycle lifetime of the battery. During mixing, chemical reactions take place in the paste producing basic lead sulfates, the most common of which is tribasic lead sulfate. The final paste composition is a mixture of basic lead sulfates, unreacted lead monoxide and residual free lead particles. Pasting is the process of making a battery plate. This paste is dispersed into a commercial automatic pasting machine of a type common in the industry, which applies the paste to a grid structure composed of a lead alloy at high speed. The paste plates are generally surface dried in a tunnel dryer of a type common in the industry and then either stacked in columns or placed on racks. The stacked or racked plates are then placed in curing chambers. It is very important during the entire pasting and curing operation that the paste has sufficient mechanical strength to avoid microcrack formation and hence increased internal electrical resistance from the paste mix. A high internal electrical resistance can limit rates of discharge and charging as well as result in localized heating during charging/discharging and increased chemical degradation of the active species.

In efforts to reduce the high impedance of the battery to accelerate the formation (first charging) step, carbon black has been added to the paste. However, to properly disperse the carbon black surfactants are employed, but these surfactants create higher impedance that is difficult for the carbon black particles to reduce. Also, because there is often a region of high impedance due to the non-homogeneous contact resistance of the powders there is often applied an overvoltage which results in electrolysis of water, generating oxygen at the cathode which then rapidly degrades the carbon black. It is highly desirable to have a means to lower impedance in lead-acid batteries that can avoid overvoltage requirements for charging as well as a longer lasting conducting additive for the cathode.

SUMMARY

The present invention relates to lead-acid battery comprising of a plurality of discrete carbon nanotube fibers having an aspect ratio of from about 10 to about 500 and optionally wherein the discrete carbon nanotubes are open ended. The carbon nanotube fibers can comprise an oxidation level from about 1 weight percent to about 15 weight percent. The mixture of the plurality of discrete carbon nanotubes can comprise at least one surfactant or dispersing aid, which contains a sulfate moiety. The composition of oxidized and discrete carbon nanotubes can be dispersed in water to make the expander material and/or the battery paste.

A further aspect of this invention is a material for a battery paste for a lead-acid battery comprising a plurality of discrete carbon nanotubes having an aspect ratio of from about 10 to about 500, preferably from about 25 to about 250, an organic material, and optionally at least one inorganic salt, such as barium sulfate, tetra-basic lead sulfate, calcium sulfate or tin oxide, and optionally at least one non-fiber carbon moiety, such as graphite, graphene, graphene plates, functionalized graphene, oxidized or oxygenated graphene, or carbon black. The organic material may comprise a sulfonated polymer, preferably one selected from the group consisting of sulfonated polymers including but not limited to, lignosulfonate, sulfonated polystyrene or combinations of sulfonated polymers thereof.

Another aspect of this invention is a process to form a lead-acid battery comprising the steps of a) selecting discrete carbon nanotube fibers having an aspect ratio of from about 10 to 500, b) selecting discrete carbon nanotube fibers having an oxidation level from 1-15% by weight, c) selecting discrete carbon nanotubes having at least a portion of open-ended tubes, d) blending the fibers with a liquid to form a liquid/fiber mixture, d) optionally combining the liquid/fiber mixture with a sulfonated polymer, f) optionally adjusting the pH to a desired level, g) optionally combining the liquid/fiber mixture with at least one surfactant, h) agitating the liquid/fiber mixture to a degree sufficient to disperse the fibers to form a liquid/dispersed fiber mixture, i) optionally combining the liquid/dispersed fiber mixture with at least one inorganic salt, j) optionally combining at least one non-fiber carbon moiety, k) optionally drying the dispersed fiber mixture, and l) combining the dispersed carbon nanotube fiber/composite mixture with the lead containing components to form a battery paste mix. The agitation step h) preferably is with sonication.

A further aspect of this invention is the carbon nanotube fibers can be combined or coated with at least one conductive polymer, preferably one selected from the group consisting of polyaniline, polyphylene vinylene, polyvinylpyrollidone, polyacetylene, polythiophene, polyphenylene sulfide, their blends, copolymers, and derivatives thereof.

One embodiment of this invention is a battery that has at least one layer comprising discrete carbon nanotube fibers.

Another embodiment of this invention is a battery paste comprising discrete carbon nanotubes that exhibits at least 10% improved adhesion to the electrodes such as carbon/lead and other lead or carbon type electrodes than those pastes without carbon nanotubes.

Yet another embodiment of this invention is a battery comprising discrete carbon nanotubes that exhibits at least 10% increase in ion transport at any temperature for a given electrolyte concentration compared to those batteries without carbon nanotubes at the same electrolyte concentration and temperature.

A further embodiment of this invention is a negative electrode for an energy storage device, comprising: a current collector; a corrosion-resistant conductive coating secured to at least one face of the current collector; a sheet comprising carbon particles and carbon nanotube fibers comprising 1-15 percent weight oxidized species and of aspect ratio of from about I 0 to about 500, said sheet adhered to the corrosion-resistant conductive coating; a tab portion extending from a side of said negative electrode; optionally a lug comprising a lead or lead alloy that encapsulates the tab portion; and a optionally a east-on strap comprising lead or lead alloy above the lug and encapsulating at least part of the lug.

Another aspect of this invention is a lead-acid battery wherein at least one of the electrode battery pastes has a gradient of concentration of discrete carbon nanotubes through the thickness of the paste, optionally having the highest concentration of the material at the surface of the current collector or at the surface of the separator.

A further aspect of this invention is a lead-acid battery of comprising discrete carbon nanotubes useful for vehicles equipped with energy regenerative braking systems or startstop technology for improved fuel efficiency. Also they can be useful for uninterrupted power supplies and power smoothing.

DETAILED DESCRIPTION

In the following description, certain details are set forth such as specific quantities, sizes, etc., so as to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

While most of the terms used herein will be recognizable to those of ordinary skill in the art, it should be understood, however, that when not explicitly defined, terms should be interpreted as adopting a meaning presently accepted by those of ordinary skill in the art. In cases where the construction of a term would render it meaningless or essentially meaningless, the definition should be taken from Webster's Dictionary, 3rd Edition, 2009. Definitions and/or interpretations should not be incorporated from other patent applications, patents, or publications, related or not, unless specifically stated in this specification or if the incorporation is necessary for maintaining validity. Aspect ratio is the ratio of length divided by diameter (L/D) where the selected units for length and diameter are the same, thus canceling the units when ratioed, making the aspect ratio a unitless number.

For an automotive positive plate paste mix, the specific gravity of the sulfuric acid in the mixture examples is preferably approximately 1.400 and the paste density is typically in the range of approximately 4.15-4.27 g/cc. For the automotive negative plate paste mix, the specific gravity of the sulfuric acid is preferably approximately 1.400 and the paste density is typically in the range of approximately 4.27-4.39 g/cc. For the industrial positive plate paste mix, the specific gravity of the sulfuric acid is preferably approximately 1.400 and the paste density is typically in the range of approximately 4.33-4.45 g/cc. For the industrial negative plate paste mix the specific gravity of the sulfuric acid is preferably approximately 1.400 and the paste density is typically in the range of approximately 4.45-4.57 g/cc. The paste density is a measure of the composition of the paste and also of its suitability for being pasted by commercial paste mixing machines. The "flock" component is a fibrous material, usually composed of polyester, nylon or acrylic fibers, which is added optionally to the paste to increase the mechanical strength of the pasted plate. The "expander" component is conventionally a mixture of barium sulfate, carbon black and lignosulfonate that is added to the negative paste to improve the performance and life of the negative plate.

In various embodiments, a plurality of carbon nanotubes is disclosed comprising single wall, double wall or multi wall carbon nanotube fibers having an aspect ratio of from about 10 to about 500, preferably from about 60 to about 200, and a oxidation level of from about 1 weight percent to about 15 weight percent, preferably from about 2 weight percent to about 10 weight percent. The oxidation level is defined as the amount by weight of oxygenated species covalently bound to the carbon nanotube. The thermogravimetric method for the determination of the percent weight of oxygenated species on the carbon nanotube involves taking about 5 mg of the dried oxidized carbon nanotube and heating at 5° C./minute from room temperature to 1000 degrees centigrade in a dry nitrogen atmosphere. The percentage weight loss from 200 to 600 degrees centigrade is taken as the percent weight loss of oxygenated species. The oxygenated species can also be quantified using fourier transform infra-red spectroscopy, FTIR, particularly in the wavelength range 1730-1680 $cm^{-1}$, or by using energy dispersive x-ray measurements.

The carbon nanotube fibers can have oxidation species comprising of carboxylic acid or derivative carbonyl containing species and are essentially discrete individual fibers, not entangled as a mass. The derivative carbonyl species can include ketones, quaternary amines, amides, esters, acyl halogens, monovalent metal salts and the like.

An illustrative process for producing discrete oxidized carbon nanotubes follows: 3 liters of sulfuric acid, 97 percent sulfuric acid and 3 percent water, and 1 liter of concentrated nitric acid containing 70 percent nitric acid and 3 percent water, are added into a 10 liter temperature controlled reaction vessel fitted with a sonicator and stirrer. 40 grams of non-discrete carbon nanotubes, grade Flowtube 9000 from CNano corporation, are loaded into the reactor vessel while stirring the acid mixture and the temperature maintained at 30° C. The sonicator power is set at 130-150 watts and the reaction is continued for three hours. After 3 hours the viscous solution is transferred to a filter with a 5 micron filter mesh and much of the acid mixture removed by filtering using a 100 psi pressure. The filter cake is washed one times with about four liters of deionized water followed by one wash of four liters of an ammonium hydroxide solution at pH greater than 9 and then about two more washes with four liters of deionized water. The resultant pH of the final wash is 4.5. A small sample of the filter cake is dried in vacuum at 100° C. for four hours and a thermogravimetric analysis taken as described previously. The amount of oxidized species on the fiber is 8 percent weight and the average aspect ratio as determined by scanning electron microscopy to be 60.

The discrete oxidized carbon nanotubes (CNT) in wet form are added to water to form a concentration by weight of 1 percent and the pH is adjusted to 9 using ammonium hydroxide. Sodium dodecylbenzene sulfonic acid and is added at a concentration 1.5 times the mass of oxidized carbon nanotubes. The solution is sonicated while stirring until the CNT are fully dispersed in the solution. Sufficient dispersion of individual tubes is defined when the UV absorption at 500 nm is above 1.2 absorption units for a concentration of $2.5 \times 10^{-5}$ g CNT/ml.

An illustrative process for producing discrete carbon nanotube/graphene compositions follows: 3 liters of sulfuric acid, 97% sulfuric acid and 3% water, and 1 liter of concentrated nitric acid containing 70% nitric acid and 30% water, are added into a 10 liter temperature controlled reaction vessel fitted with a sonicator and stirrer. 20 grams of non-discrete carbon nanotubes, grade Flowtube 9000 from CNano Corporation, and 20 grams of expanded graphite obtained from Rice University, Houston, Tex., USA are loaded into the reactor vessel while stirring the acid mixture and the temperature maintained at 25° C. The sonicator power is set at 130-150 watts and the reaction is continued for 3 hours. After 3 hours the viscous solution is transferred to a filter with a 5 micron filter mesh and much of the acid mixture removed by filtering using about 100 psi pressure. The filter cake is washed 1 times with 4 liters of deionized water followed by 1 wash of 4 liters of an ammonium hydroxide solution at pH>9 and then two or more washes with 4 liters of deionized water. The resultant pH of the final wash is 4.5. An electron micrograph will show graphene plates interspersed carbon nanotubes.

Cathode or Negative Active Material Paste

Control 1. 79.3 grams of Massicot (lead(II) oxide), is mixed with 0.634 grams of sodium sulfate and 0.793 grams of expander material (Hammond, grade 631). 9.28 grams of water is combined with a 0.397 grams of Teflon emulsion (Du Pont, K20) and added to the Massicot containing mixture. 17.08 grams of sulfuric acid, specific gravity 1.4, is then slowly added while mixing, and maintaining the temperature between 49 and 54 degrees centigrade. The mixture is mixed thoroughly. The density of the paste is 63.2 g/inch cubed.

EXAMPLE 1

The negative active paste material is made as control 1 except that the expander material contains discrete carbon nanotubes which is made as follows. 10 grams of Hammond expander 631 which contains lignosulfonate, barium sulfate and carbon black, is added to 200 cc of deionized water. 0.25 grams of carbon nanotubes oxidized to approximately 6% by weight, is added followed by sonication in a sonicator bath for 30 minutes. The mixture containing the carbon nanotubes is then dried to give a free flowing powder.

Anode, or Positive Active Material, Paste

Control 2. 75.7 grams of Red lead (lead(III) tetroxide), is mixed with 0.6056 grams of sodium sulfate. 14.83 grams of water is combined with a 0.389 grams of Teflon emulsion (Du Pont, grade K20) and added to the Massicot containing mixture. 15 grams of sulfuric acid, specific gravity 1.4, is then slowly added while mixing, and maintaining the temperature between 49 and 54 degrees centigrade. The mixture is mixed thoroughly. The density of the paste is 60.78 g/inch cubed.

EXAMPLE 2

A single battery cell is constructed by evenly coating lead cathode and anode film with negative and positive paste, respectively, interspersing a glass fiber matt, then filling with sulfuric acid of specific gravity 1. The negative paste has 0.05% weight carbon nanotubes relative to the starting lead oxide.

Control 3. A single battery cell is constructed by evenly coating lead cathode and anode film with negative and positive paste, respectively, interspersing a glass fiber matt, then filling with sulfuric acid of specific gravity 1.1 2. The negative paste contains no carbon nanotubes.

The cell of control 3 is determined to have an internal resistance of 100 ohms. The cell of example 2 containing the discrete carbon nanotubes is determined to have an internal resistance of 50 ohms.

EXAMPLE 3

A single battery cell is constructed by evenly coating lead cathode and anode film with negative and positive paste, respectively, interspersing a glass fiber matt, then filling with sulfuric acid of specific gravity 1.12. The positive and negative paste has 0.16% weight carbon nanotubes relative to the starting lead oxide. The pastes of Example 3 are observed to be more easily handled and transferred to the lead current collector plates without breakage than Control 3.

Figure 1:
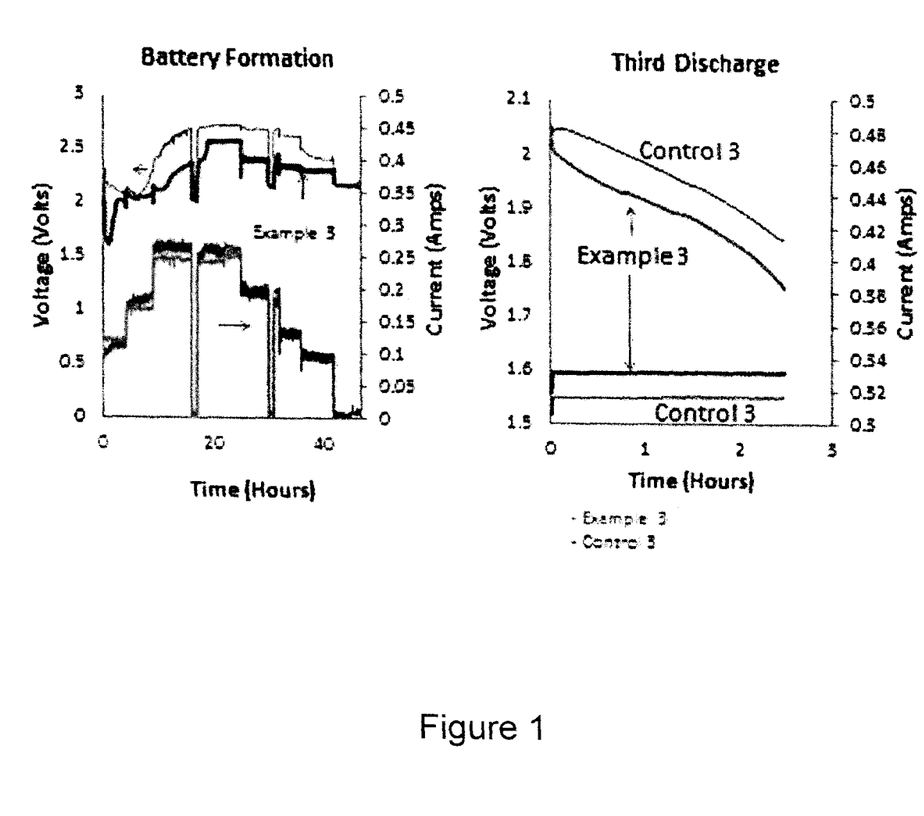
FIG. 1 shows a charge profile at constant amperage for a lead acid battery with carbon nanotubes according to the present invention (Example 3), and without carbon nanotubes according to the present invention (Control 3).

Shown in FIG. 1 is a typical current limiting first charge cycle for control 3 and Example 3. Although in each case the current profile is the same, the voltage for the Example 3 is lower, exemplifying that Example 3 with carbon nanotubes of this invention has a lower impedance than control 3. Furthermore, overvoltage which produces electrolysis of the water is avoided in example 3 compared to Control 3. Also seen in FIG. 1 on discharging at a rate that would fully discharge the battery in 3 hours, the Example is seen to exhibit the benefits of a lower voltage but higher current compared to the control.

Figure 2:
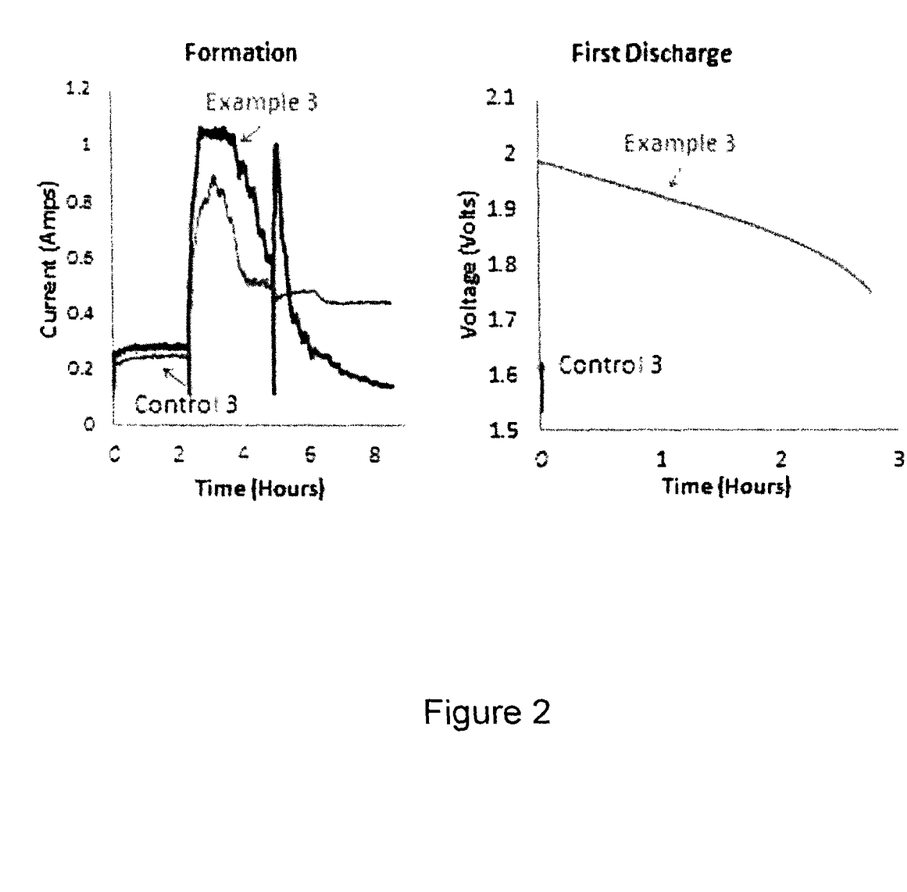
FIG. 2 shows a charge profile at constant voltage for a lead acid battery with carbon nanotubes according to the present invention (Example 3), and without carbon nanotubes according to the present invention (Control 3).

Shown in FIG. 2 is the result of charging Example 3 and Control 3 at a constant voltage in two steps. After 2 hours the voltage was raised to 2.3 volts. Example 3 is able to absorb a much higher current than Control 3 and could be fully charged. On discharging, Example 3 gave an expected discharge profile whereas the Control 3 had deemed to have failed. The results of Example 3 are considered to be consistent with the paste having a much enhanced and more uniform conductivity.

Figure 3:
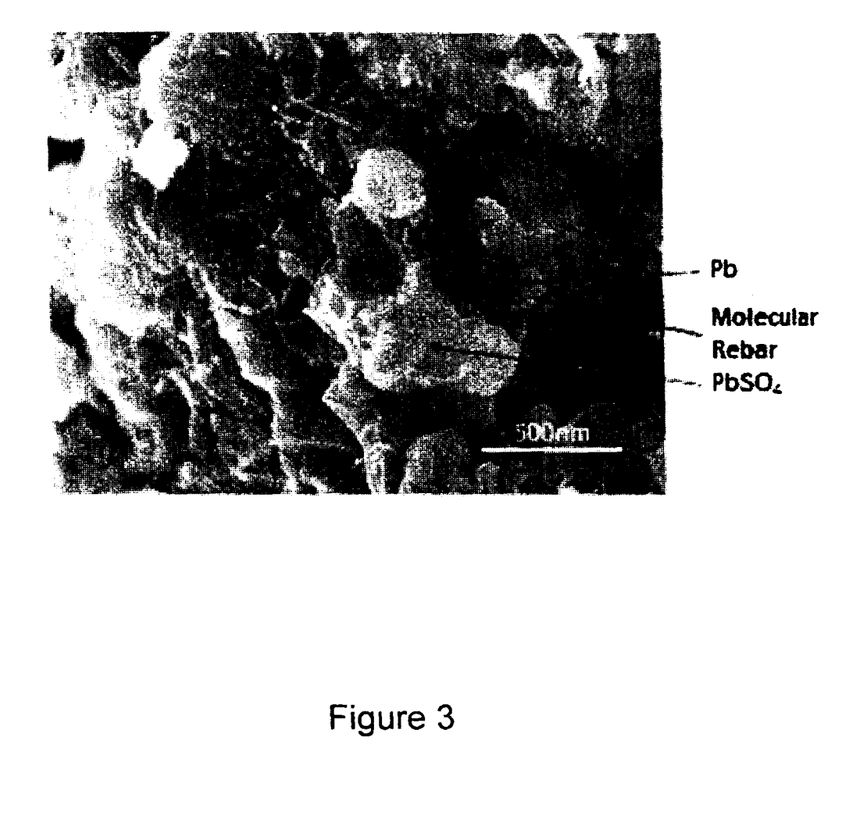
FIG. 3 shows an electron micrograph of the dried anode material of example 3 after 14 charging and discharging cycles.

Shown in FIG. 3 is an electron micrograph of the dried anode material of Example 3 after 14 charges and discharges. On the 14th discharge it was discharged to 1.75 volts, i.e. not fully discharged, therefore two crystal types are present, lead and lead sulfate, as illustrated in FIG. 3. The carbon nanotubes of this invention are seen to be very well interspersed between the lead particles. The lead sulfate crystals are seen to incorporate the carbon nanotubes of this invention.

Figure 4:
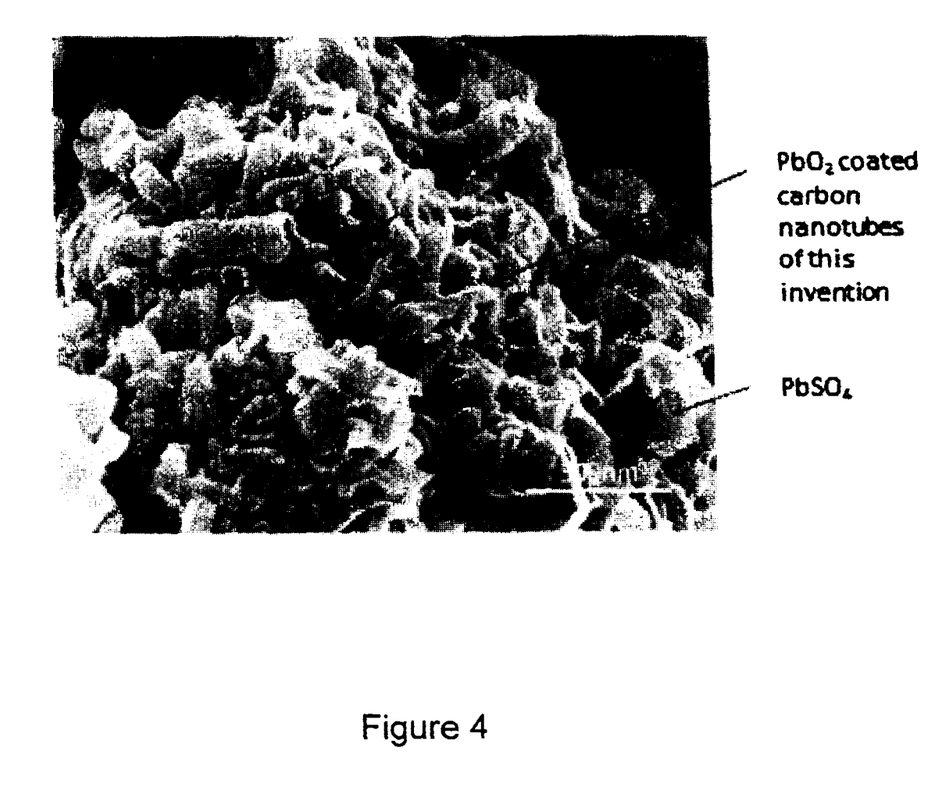
FIG. 4 shows an electron micrograph of the dried cathode material of example 3 after 14 charging and discharging cycles.

Shown in FIG. 4 is an electron micrograph of the dried cathode material of Example 3 after 14 charges and discharges. On the 14th discharge it was discharged to 1.75 volts, i.e. not fully discharged, therefore two crystal types are present, lead dioxide and lead sulfate, as illustrated in FIG. 4. The carbon nanotubes of this invention are seen to be incorporated within the lead dioxide and lead sulfate crystals. This illustrates that the carbon surfaces are protected by the lead dioxide or lead sulfate and so would be expected to be less prone to oxidative attack if electrolysis occurs by over voltage.

The invention claimed is:
1. A composition for lead-acid battery construction comprising:
   a plurality of discrete carbon nanotubes, not entangled as a mass, the nanotubes having an aspect ratio of about 10 to about 500;
   wherein the discrete carbon nanotubes are open ended; and wherein the discrete carbon nanotubes have an oxidation level of from about 1 weight percent to about 15 weight percent.

2. The composition of claim 1, further comprising at least one surfactant or dispersing aid.

3. The composition of claim 1, further comprising at least one surfactant or dispersing aid, wherein the surfactant or dispersing aid contains a sulfate moiety.

4. The composition of claim 1, further comprising a sulfonated polymer selected from the group consisting of: ligno-sulfonate, sulfonated polystyrene, and combinations thereof.

5. The composition of claim 1, further comprising conducting polymers selected from the group consisting of: polyaniline, polyphenylene vinylene, polyvinylpyrollidone, polyacetylene polythiophene, polyphenylene sulfide, and blends, copolymers, and derivatives thereof.

6. The composition of claim 1, further comprising water and wherein the nanotubes are dispersed in the water to form an expander material or battery paste.

7. The composition of claim 1, further comprising a non-fiber carbon moiety.

8. The composition of claim 1, further comprising an organic material;
an inorganic salt; and a non-fiber carbon moiety.

9. The composition of claim 8 wherein when said composition is employed as a battery paste the battery paste exhibits (1) at least 10% improved adhesion to carbon/lead electrodes, lead electrodes, or carbon electrodes, than pastes without carbon nanotubes; or (2) a 10% or greater increase in ion transport at any temperature for a given electrolyte concentration compared to a battery without carbon nanotubes at the same electrolyte concentration and temperature; or (3) both (1) and (2).

10. The composition of claim 9 wherein when said composition is employed as a battery paste the battery paste exhibits at least 10% improved adhesion to carbon/lead electrodes, lead electrodes, or carbon electrodes, than pastes without carbon nanotubes.

11. The composition of claim 9 wherein when said composition is employed as a battery paste the battery paste exhibits a 10% or greater increase in ion transport at any temperature for a given electrolyte concentration compared to a battery without carbon nanotubes at the same electrolyte concentration and temperature.

12. The composition of claim 8 wherein when said composition is employed as a battery paste the battery paste exhibits (1) at least 10% improved adhesion to carbon/lead electrodes, lead electrodes, or carbon electrodes, than pastes without carbon nanotubes; and (2) a 10% or greater increase in ion transport at any temperature for a given electrolyte concentration compared to a battery without carbon nanotubes at the same electrolyte concentration and temperature.

13. The composition of claim 8 wherein the inorganic salt is selected from the group consisting of barium sulfate, lead sulfate, calcium sulfate and tin oxide.

14. The composition of claim 7 wherein the non-fiber carbon moiety is selected from the group consisting of carbon black, graphite and graphene.

15. The composition of claim 8 wherein the non-fiber carbon moiety is selected from the group consisting of carbon black, graphite and graphene.

16. A composition for lead-acid battery construction comprising:
a plurality of discrete carbon nanotubes, not entangled as a mass, the nanotubes having an aspect ratio of about 10 to about 500;
wherein the discrete carbon nanotubes are open ended;
wherein the discrete carbon nanotubes have an oxidation level of from about 1 weight percent to about 15 weight percent; and
wherein the discrete carbon nanotubes are coated with a conductive polymer.

17. The composition of claim 16 wherein the conductive polymer is selected from the group consisting of: polyaniline, polyphenylene vinylene, polyvinylpyrollidone, polyacetylene polythiophene, polyphenylene sulfide, and blends, copolymers, and derivatives thereof.

18. The composition of claim 16, further comprising an organic material; an inorganic salt; and a non-fiber carbon moiety.

19. The composition of claim 18, wherein the inorganic salt is selected from the group consisting of barium sulfate, lead sulfate, calcium sulfate and tin oxide.

20. The composition of claim 18, wherein the non-fiber carbon moiety is selected from the group consisting of carbon black, graphite and graphene.

21. A composition for lead-acid battery construction comprising:
(a) a plurality of discrete carbon nanotubes, not entangled as a mass, the nanotubes having an aspect ratio of about 10 to about 500;
wherein the discrete carbon nanotubes are open ended;
wherein the discrete carbon nanotubes have an oxidation level of from about 1 weight percent to about 15 weight percent; and
wherein the discrete carbon nanotubes are coated with a conductive polymer;
(b) an inorganic salt is selected from the group consisting of barium sulfate, lead sulfate, calcium sulfate and tin oxide; and
(c) a non-fiber carbon moiety is selected from the group consisting of carbon black, graphite and graphene.

22. The composition of claim 21 further comprising an organic material.

* * * * *